MICHAEL J. MARKAKIS
INVENTOR.

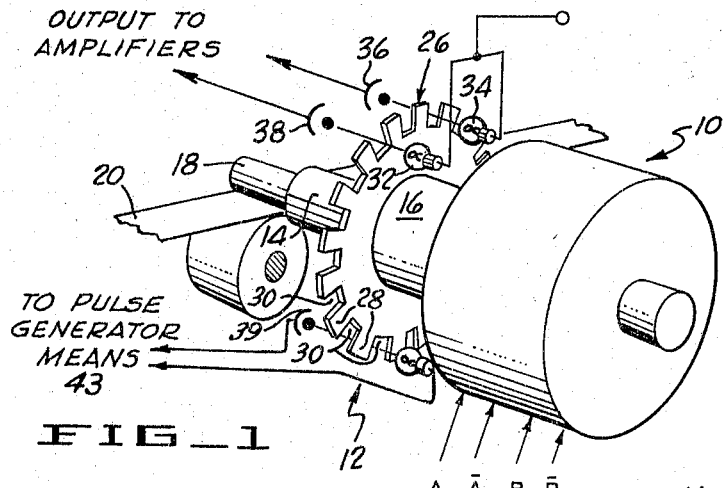
FIG_1
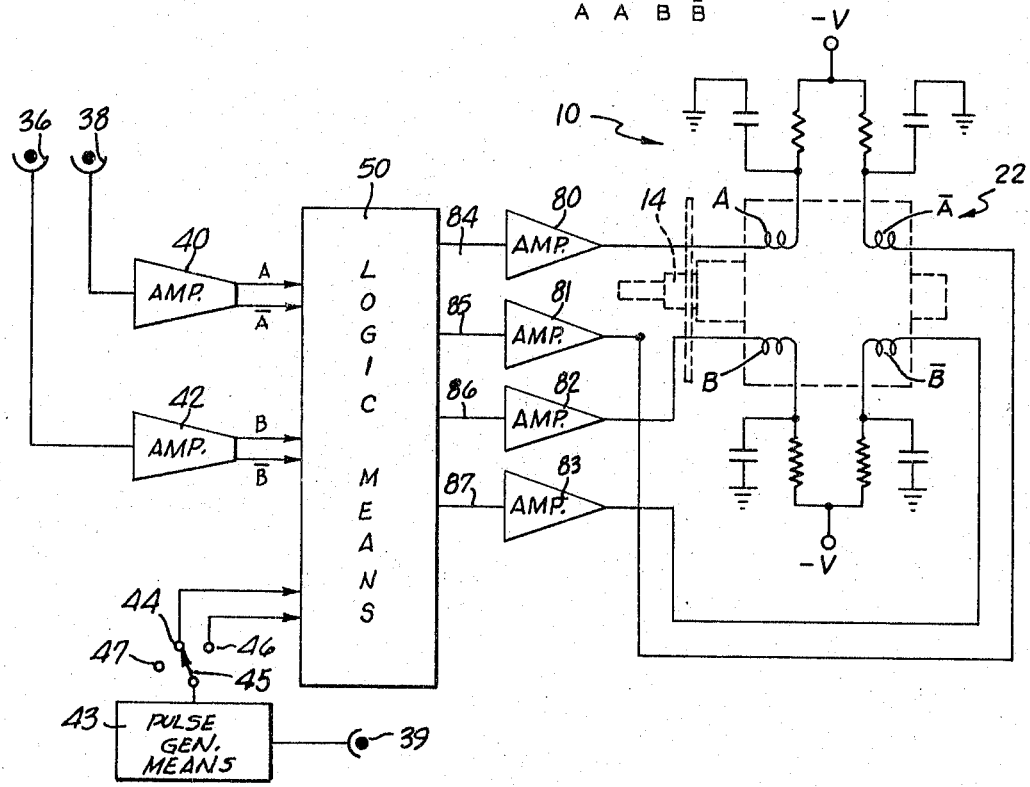
FIG_2
MICHAEL J. MARKAKIS
INVENTOR.
BY Stuart Lubitz
ATTORNEY

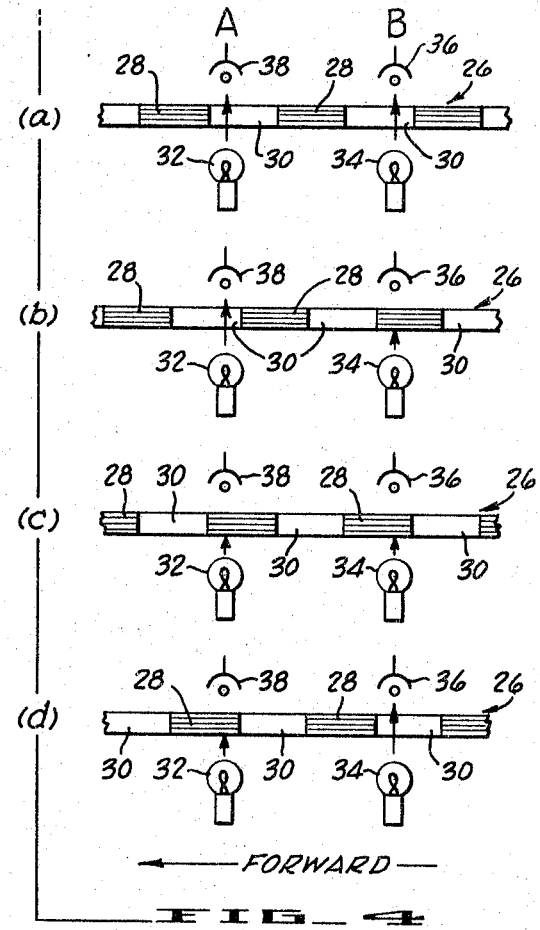
FIG_4
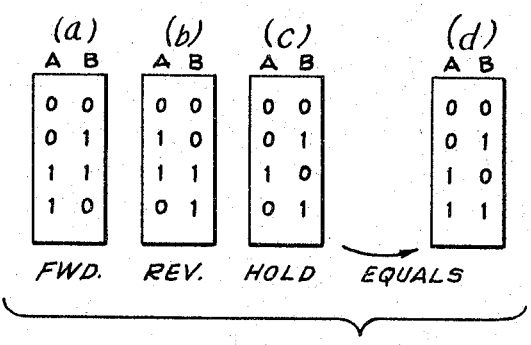
FIG_5

United States Patent Office 3,324,369
Patented June 6, 1967

3,324,369
CONTROL SYSTEM FOR INCREMENTAL MOTORS HAVING WINDING CONDITION SENSING INCLUDING PHOTOCELLS
Michael J. Markakis, Palo Alto, Calif., assignor to Ampex Corporation, Redwood City, Calif., a corporation of California
Filed Oct. 6, 1964, Ser. No. 401,825
10 Claims. (Cl. 318—138)

ABSTRACT OF THE DISCLOSURE

Incremental motor control apparatus for stepping a multi-winding motor through a large plurality of increments by sensing the state of the motor winding energizations and supplying signals representative thereof to a logic means to energize the motor.

This invention relates to an incremental motor control system and more particularly to an incremental recorder system employing an incremental motor wherein the logic means for enabling the energization of the motor has input signals representative of the state of the motor winding energization supplied thereto by a sensing means coupled to the motor.

Incremental recorder systems employ a transport means that is able to incrementally step the recording media to a number of stable positions. One commonly used transport means includes an incremental motor coupled to the media via a capstan. These motors may take the form of synchronous inductor motors (see "Characteristics of a Synchronous Inductor Motor," Applications and Industry, published by the American Institute of Electrical Engineers, March 1962) having their winding appropriately energized and including detenting means to maintain the motor output shaft in any of a plurality of stable positions. The windings of the motor may be energized or de-energized during the detenting depending on the specific construction of the motor. To move the motor output shaft, the polarity or level of the voltage or current applied to the windings are switched in a given sequence by a logic means. It is the energization of the windings by the logic means in a given sequence that is the concern of this invention.

In prior art recorder systems there has generally been no means included for determining the existing state of energization of the windings. In order to energize the motor, the energizing flip-flops or other sources switch the current or voltage applied to the winding through the various energization states until the output shaft moves. This mode of operation results in a time lag and relatively slow operation. In addition, when the power applied to the motor and its control system is temporarily removed, such as by a power failure, then the proper relationship between the logic means and the windings is often lost.

The invention overcomes the above disadvantages of the prior art systems by providing a sensing means which senses the energization state of the motor windings and transmits signals representative of this state of the logic means. These signals condition the logic means so that its output shaft will immediately increment upon the application of forward or reverse signals to the logic means. This permits the motor to be energized without any loss of time hunting for the appropriate energization relationship. In one particular embodiment of the invention the sensing means is coupled to the output shaft so that it is not affected by temporary removal of the power and consequently the state of energization is available whenever power becomes available. The bi-stable devices, such as flip-flops employed in many of the prior art logic means, are eliminated thereby making the system less sensitive to noise and improving its reliability. An output signal may also be derived by a sensing means to indicate the end of a step by the motor output shaft. This signal may be used to facilitate system synchronism. Finally, the logic means is such that a continuous forward or reverse signal will cause high speed movement or slewing of the media. This enables high speed searching of the media by simply changing the nature of the forward or reverse signal.

Briefly, the structure employed to accomplish the above described advantages comprises an incremental motor having a plurality of windings and an output shaft coupled to the windings to incrementally move to a plurality of stable positions in a forward or reverse direction when said windings are energized, sensing means coupled to said output shaft for generating a plurality of output signals representative of the energization state of said windings, logic means coupled to said sensing means for enabling said windings to be energized in a forward or reverse direction by application of a forward or reverse signal, said output signals from said sensing means conditioning said logic means, and means for applying a forward signal or reverse signal to said logic means, whereby said windings are enabled in a sequence resulting in the movement in the desired forward or reverse direction.

With this general structure in mind, a specific embodiment of the invention will be considered as an example of one construction that may be employed consistent with the broader aspects of the invention. This embodiment can be understood by considering the detailed written description which follows and the drawings wherein:

FIGURE 1 is a perspective schematic diagram showing the co-operation between the incremental motor, sensing means, capstan and recording media;

FIGURE 2 is a block diagram showing the motor and motor control system;

FIGURES 4 and 5 are diagrams helpful in explaining the operation of the system.

Figure 3:
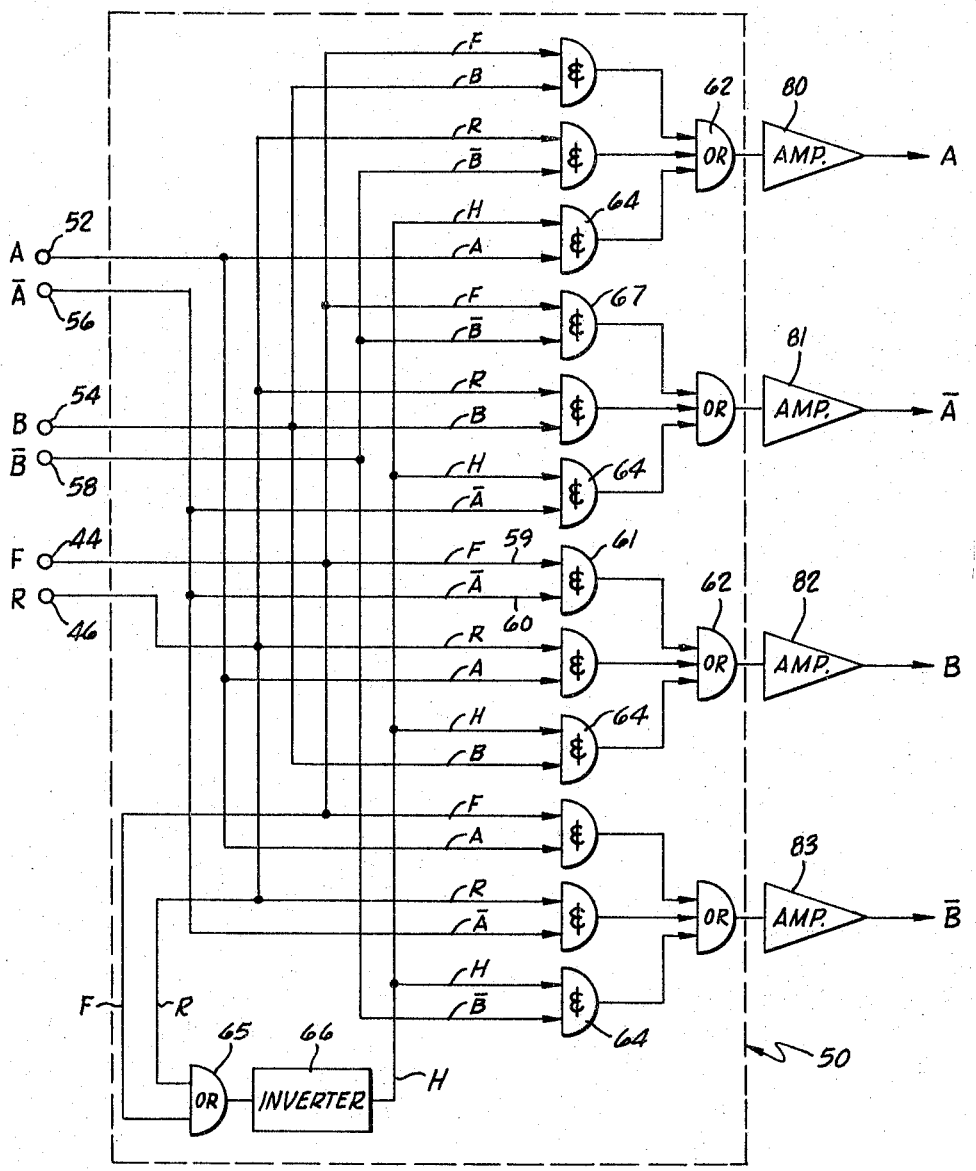
FIGURE 3 is a logic block diagram showing the logic means of FIGURE 2.

Referring to FIGURES 1 and 2, a part of an incremental recorder system is shown. This system comprises an incremental motor 10, a sensing means 12 coupled to the output shaft 14 via suitable coupling means 16. The shaft 14 is in turn connected to capstan 18 for driving the recording media 20.

The motor 10 may be a synchronous inductor motor such as the one described in the above-cited article "Characteristics of a Synchronous Inductor Motor" or it may be a stepping motor such as the one described in U.S. Patent 2,834,896. Briefly a synchronous stepping motor includes a plurality of windings, such as windings 22 which are designated as A, B, $\overline{A}$ and $\overline{B}$. For the motor to step an increment from one position to another it is necessary that switching operations take place in a given sequence. For example to step the motor through a series of steps in a forward direction, assuming initially that windings A and B are de-energized with windings $\overline{A}$ and $\overline{B}$ being energized, it is necessary to switch the energization of winding $\overline{B}$ off and in turn switch the energization of winding B on. This switching will result in the output shaft 14 moving to a new stable position. Subsequently, the winding $\overline{A}$ is switched off and the winding A is switched on resulting in another stepping movement of shaft 14 to a new stable position. The winding B is then switched off and the winding $\overline{B}$ switched on resulting in a third stepping movement. The final stepping movement is accomplished by returning the windings to their original state. This is shown in FIGURE 4 in sequence *a, b, c, d*, and listed in the table of FIGURE 5(*a*).

The movement of the stepping motor 10 is coupled to the output shaft 14 by the coupling means 16 which may take the form of various driving arrangements including gears, clutches, flexible coupling devices and other common well known elements or the shaft of the motor rotor shaft may be the output shaft 14. The output shaft 14 is in turn coupled to the capstan 18 which may be any of the well known rubber surfaced, roughened or other well known capstan elements.

The sensing means 12 is coupled to the output shaft 14 of the motor 10. The sensing means 12 may be, of course, be placed on any of the rotatable elements between the motor rotor shaft (not shown) and the capstan that assumes a position having relationship to the energization state of the windings 22. In addition, the invention in its broadest aspects may take the form of electrical or electronic means coupled to the windings 22 to perform the sensing function. The more specific aspect of the invention includes the sensing means on the output shaft 14 which is a particularly simple and reliable arrangement.

In the specific embodiment shown in FIGURE 1, the sensing means 12 comprises a disk or member 26 having a plurality of position indicating means 28 and 30 located thereon. The position indicating means 28 and 30 are shown as taking the form of abutments 28 and notches 30, but may alternately take the form of an opaque disk with transparent portions located about its periphery, a non-magnetic member having permanent magnetic inserts, vice versa, or any other form that enables the position of the output shaft 14 to be related to the energization state of the windings 22. The notched disk 26 is located between a plurality of illuminating means 32 and 34, and photocells 36 and 38 which are aligned to form a transducing means. The transducing means generates a first signal when the position indicating means 28 are in the proximity of the transducing means blocking off the light from means 32 and 34 to photocells 36 and 38 and a second signal when the position indicating means 28 are in a removed position from the transducing means permitting light from means 32 and 34 to reach photocells 36 and 38. From this it can be seen that if the position indicating means 28 and 30 and the transducing means 32-38 are properly arranged, the combination of elements will enable a total of four different binary signals to be generated. These signals may be representative of the four different states of energization that the windings 22 may assume. The sensing means 12 may be adopted for use with motors having more than four windings. Where the notched disk is replaced by a non-magnetic disk having inserts of permanent magnetic material, the transducer means 32-38 may be replaced by a flux sensitive magnetic head such as the one described in U.S. Patent 2,866,013 issued on Dec. 23, 1958 to Reis.

The output signals from the photocells 36 and 38 are supplied to amplifiers 40 and 42 which are in turn connected to the logic means 50 (FIGURE 2). The logic means 50 is conditioned by the signals supplied by the photocells 36 and 38 to enable the windings to be energized in a predetermined sequence by the application of forward or reverse signals. A pulse generator means 43 may be connected to the terminals 44 and 46 by a switch 45 to supply forward and reverse pulses to the logic means 50. With a given input from the photocells 36 and 38, the successive application of forward signals to the terminal 44 results in the energization of the windings 22 in a manner to cause output shaft 14 to move in a first or forward direction.

It should be noted that each time the motor 10 steps output shaft 14 to a new stable position, the input from the photocells 36 and 38 to the logic means 50 changes. The pulse supplied to the terminal 44 by the pulse generator means 43 is terminated prior to the time that the photocells 36 and 38 supply a new signal to the logic means 50. This termination of the pulses may be accomplished by placing a transducing means 39 adjacent the notched disk 26 which responds faster than the photocells 36 and 38 or which senses the motion of the disk 26 rather than its ultimate position. This transducer means is in turn connected to the pulse generator means 43 to trigger the termination of the pulse supplied to the terminal 44.

Once the new signal from the photocells 36 and 38 are supplied to the logic means 50, another forward pulse may be supplied to the terminal 44 and the motor will again step in the forward direction. This stepping in the forward direction will continue as long as forward pulses are supplied to the terminal 44. Similarly, connecting switch arm 45 to the terminal 46 will result in the supply of reverse signals to the logic means 50. With the conditioning of the logic means by the photocells 36 and 38, the supplying of these pulses to the terminal 46 will result in the motor stepping in a reverse direction.

The logic means 50 has a plurality of drive amplifiers 80–83 connected to its output lines 84–87. These amplifiers are in turn connected to the windings A, B, $\overline{A}$ and $\overline{B}$ and energize the winding as enabled by the logic means 50. The windings are each connected to an R.C. circuit which speeds up the current flow through the windings, permitting a reduction in the period of each increment.

Before the operation of the invention is considered, a typical logic arrangement that may be employed in the logic means will be considered. Such a logic means is shown in the block diagram of FIGURE 3. The logic means 50 is made up of a plurality of AND and OR circuits and an inverter. The AND, OR circuits and inverter are connected as shown in FIGURE 3. The structural significance of these interconnections can be understood by considering the operation or cooperation of these elements.

In order that the motor may be incremented in a forward direction, the windings A, $\overline{A}$, B and $\overline{B}$ are energized in a predetermined sequence. Such a sequence is shown in FIGURE 5(*a*) where the energization state of the windings A and B are designated by the presense of a "1" or "0" in the appropriate column. The "1" represents a voltage or current level being applied to a winding (energization) while the "0" represents an absence of such a voltage or current (de-energization). The windings $\overline{A}$ and $\overline{B}$ assume the reverse state of energization with respect to windings A and B. It should be understood that the terms energization ("1") and de-energization ("0") as used herein include not only the presence and absence of voltage or current inputs but also the condition where a terminal is supplied with a first and second voltage or current level input signal.

With the above in mind, assume the windings A and B to initially be in the "0" condition while $\overline{A}$ and $\overline{B}$ are in a "1" condition, the terminals 52 and 54 (FIGURE 3) would be de-energized while the terminals 56 and 58 are energized (FIGURE 5(*a*)). With this conditioning of the logic means 50, the application of a pulse to the forward signal terminal 44 will result in inputs to lines 59 and 60 of the AND circuit 61. The presence of the two inputs at the AND gate 61 results in an output signal which in turn enables the amplifier 82 via the OR circuit 62 to operate in a "1" condition. Since the amplifier 82 is connected to the B winding, this winding changes its state of energization going from the "0" condtion to the "1" condition. The amplifier 81 has AND circuit 67 which is coupled to it supplied with a voltage so it too is in the "1" condition. The amplifier 83 is connected to winding $\overline{B}$ which was previously energized is now in the "0" condition. The AND circuits coupled to amplifier 83 via the OR circuit do not have the necessary inputs thereto to transmit a "1" signal and correspondingly enable the amplifier 83. The AND circuits coupled to the amplifier 80 are in a similar condition and consequently the amplifier 80 remains in a "0" condition. Thus amplifiers 81 and 82 connected to winding A̅ and B are in a "1" condition and amplifiers 80 and 83 connected to windings A and B̅ are in a "0" condition. This state of energization conforms to the second line of the table in FIGURE 5(a).

The change from the "0"—"0" condition to a "0"–"1" condition (described above) necessary to increment the motor, was accomplished by simply applying a forward pulse (F) to terminal 44. The incrementing of the motor in the forward direction results in the sensing means 12 applying a different signal to logic means 50. The sensing means 12 now applies a voltage to terminal 54 and 56 while terminals 52 and 58 remain de-energized. These input signals condition the logic means 50 and more particularly the AND circuits. The AND circuits are conditioned so that the application of a subsequent forward pulse to the terminal 44 will result in the amplifiers 80 and 82 assuming a "1" condition while the amplifiers 81 and 83 assume a "0" condition in conformity with line 3 of FIGURE 5(a). The energization of the windings by amplifiers 80 and 82 result in the motor 10 stepping to a new stable position. This new stable position of the motor 10 will again result in a new input signal being applied to terminals 52–58 by the sensing means 12. This conditioning and pulsing process may continue for a given length of time as the medium 20 is stepped through its various positions.

The logic means 50 functions in substantially the same manner to enable the motor to be energized for movement in the reverse direction. The only difference is that pulse generator means 43 supplies pulses (R) to terminal 46 and the sequence of energization states conform to the table of FIGURE 5(b). In the hold condition, the logic means operates in accordance with the tables of FIGURE 5(c) and (d). These figures indicate that when a hold command exists the energization state of the winding is maintained regardless of its present state.

One point should be noted with regards to the AND circuits 64 connected to the amplifiers. The AND circuits 64 all have hold signals (H) applied to them. These hold signals are present when neither forward or reverse signals are applied to the OR circuit 65 which in turn is connected to the AND circuits via the inverter 66. If a forward or reverse signal is applied to the terminals 44 or 46, the OR circuit 65 transmits this signal to the inverter 66 which in turn transmits a signal of a lower voltage level to the AND circuits 64 and consequently the AND circuits 64 do not supply the higher voltage level output signal.

In summary, the logic means 50 functions as a means for enabling the windings to be energized in predetermined sequences by the application of a forward or reverse signal. This function is made possible by the conditioning of the logic means with the output signals from the sensing means.

The operation of the overall system will now be considered. Initially, the photocells 36 and 38 condition the logic means 50 with a signal that results in amplifiers 82 and 83 energizing the windings A̅ and B̅. With the energization state of the windings A̅ and B̅ in the "1" condition, the position indicating means 28, 30 are located to permit illuminating means 32 and 34 to transmit light to the photocells 36 and 38 (FIGURE 4a). The photocells when illuminated are arbitrarily defined as resulting in de-energization of the terminals 52 and 54 by the amplifiers 40 and 42 while terminals 56 and 58 are energized by these amplifiers. This condition could be easily reversed. With the amplifiers 40 and 42 conditioning the logic means 50 in this manner, the application of a signal by the pulse generator 43 to the terminal 44 will cause the logic means 50 to energize the amplifiers 81 and 83 resulting in the energization of the associated windings and the stepping movement of output shaft 14 and capstan 18. This movement of the output shaft 14 in turn results in the rotation of the disk 26 resulting in the illuminating means 32 being aligned with a notch 30 and consequently illuminating the photocell 38 while an abutment 28 remains interposed between the illuminating means 34 and the photocells 36 (FIGURE 4b). With the photocells 36 and 38 in this condition, the amplifier 40 supplies a signal representative of the state of energization of the windings A and A̅ to logic means 50 while the amplifier 42 supplies a signal representative of the state of energization of the windings B and B̅ to the same. These signals condition the logic means 50 so that a subsequent pulse supplied by the pulse generator means 43 to terminal 44 results in the stepping of the motor 10 in the forward direction. The relationship of the photocells, position indicating means, and illuminating means during the subsequent steps in the forward direction is shown in FIGURES 4(c) and 4(d).

From the above-detailed description it can be seen that the inclusion of a sensing means in the invented system enables the motor to be energized without loss of time hunting for the appropriate energizing relationship. The sensing means is dependent upon the position of the output shaft of the motor and for this reason it is not affected by the temporary removal of power from the system. In addition, the use of flip-flops or other bi-stable devices that tend to be sensitive to noise are no longer required. The logic means is such that the application of a continuous DC voltage to the terminals 44 and 46 will cause high-speed movement or skewing of the medium 20. It should also be readily apparent that the movement of the notched disk 26 which cooperates with a transducing means may supply a pulse for synchronizing other elements of the system While the above detailed description has shown, described and pointed out the fundamental novel features of the invention as applied to a preferred embodiment, it will be understood that various omissions and substitutions and changes in the form and details of the devices illustrated may be made by those skilled in the art, without departing from the spirit of the invention. It is the intention, therefore, to be limited only as indicated by the scope of the following claims.

What is claimed is:

1. An improved incremental control system for providing incremental movement to a web-like recording media via a capstan coupled to move said media and including an incremental motor having a plurality of windings, the combination comprising:

an output shaft operatively coupled to said windings and to said capstan to be incrementally moved to a plurality of stable positions in a forward or reverse direction of movement when said windings are energized in predetermined sequences, wherein the plurality of stable positions possible for one rotation of the motor is generally very much greater than the number of motor windings;

sensing means comprising a disk having evenly spaced notches formed about the entire circumference thereof coupled to said output shaft, a pair of photocells disposed on one side of said evenly notched disk and illumination means disposed on the other side of said evenly notched disk to impinge upon and thus to enable said photocells to generate output signals representative of the energization state of said windings;

logic means coupled including a single logic circuit commonly coupled to the plurality of windings and to said sensing means for enabling said windings through said plurality of stable positions in accordance with the energization state of said windings, wherein the single logic circuit is successively connected to selected windings dependent upon the relative positions of the pair of photocells and the evenly spaced notches; and means for applying a forward or reverse signal to said logic means to incrementally move said output shaft in a forward or reverse direction, wherein in the absence of a forward or reverse signal said windings are positively held in the position determined by the relative positions of the pair of photocells and the evenly spaced notches.

2. The control system of claim 1 wherein the single logic circuit has a plurality of inputs thereto which are representative of the energization state of the windings, and has a plurality of outputs connected to said plurality of windings, wherein the inputs to the logic circuit are introduced in selected succession to any of said windings to increment as well as hold the windings.

3. The control system of claim 2 wherein said single logic circuit comprises a plurality of logic units, wherein each of said plurality of inputs thereto is commonly connected to a selected group of the plurality of logic units, said means for applying a forward signal is connected to another selected group of said plurality of logic units, and said means for applying a reverse signal is connected to still another selected group of the plurality of logic units, wherein said sensing means is connected via said plurality of inputs to successively energize selected combinations of said logic unit groups in response to said means for applying the forward or reverse signals.

4. The control system of claim 3 further including logic-inverter means coupled at its input to said means for applying forward and reverse signals, said logic-inverter means having the output thereof connected to a further selected group of said plurality of logic units to provide a hold signal to the windings when the forward or reverse signals are not present.

5. The control system of claim 4 wherein said hold signal is of relatively low value compared to the signals applied to increment the windings.

6. The control system of claim 4 further including transducer means coupled between said sensing means and said means for applying forward or reverse signals to terminate the signals from the means for applying forward or reverse signals before said output signals representative of a new state of energization are supplied to said logic means.

7. The control system of claim 4 wherein said evenly spaced notches of said disk and the spacing between the pair of photocells are selected so that either zero, one or two photocells are illuminated by the illuminating means as the incremental motor assumes said various stable positions.

8. The control system of claim 7 wherein said illuminating means comprise a pair of light sources substantially aligned with respective ones of the pair of photocells.

9. The control system of claim 8 wherein the sequence of illumination of said photocells by said illuminating means is neither of the photocells is illuminated, one of the photocells is illuminated, the other of said photocells is illuminated and both of said photocells are illuminated.

10. The control system defined in claim 4 wherein said motor has at least two pair of windings commonly coupled to the single logic circuit, said sensing means further comprises a member drivingly coupled to said shaft having a plurality of position indicating means located thereon, transducing means associated with each pair of said windings for generating a first signal when a position indicating means is in the proximity of said transducing means and a second signal when a position indicating means is in a removed position relative to said transducing means, said position indicating means located on said member with respect to said transducing means and said windings to enable said transducing means to generate said first and second signals as representative of the state of energization of said windings.

References Cited

UNITED STATES PATENTS

| | | | |
|---|---|---|---|
| 2,814,769 | 11/1957 | Williams | 318—138 X |
| 3,096,467 | 7/1963 | Angus et al. | 318—138 |
| 3,124,732 | 3/1964 | Dupy | 318—138 |
| 3,204,165 | 8/1965 | Kreutzer | 318—138 |

ORIS L. RADER, *Primary Examiner.*

G. SIMMONS, *Assistant Examiner.*